Aug. 9, 1949.　　　L. R. BUCKENDALE　　　2,478,180
CONVOLUTED AXLE HOUSING MEMBER
Filed Jan. 14, 1946　　　　　　　　　　4 Sheets-Sheet 1
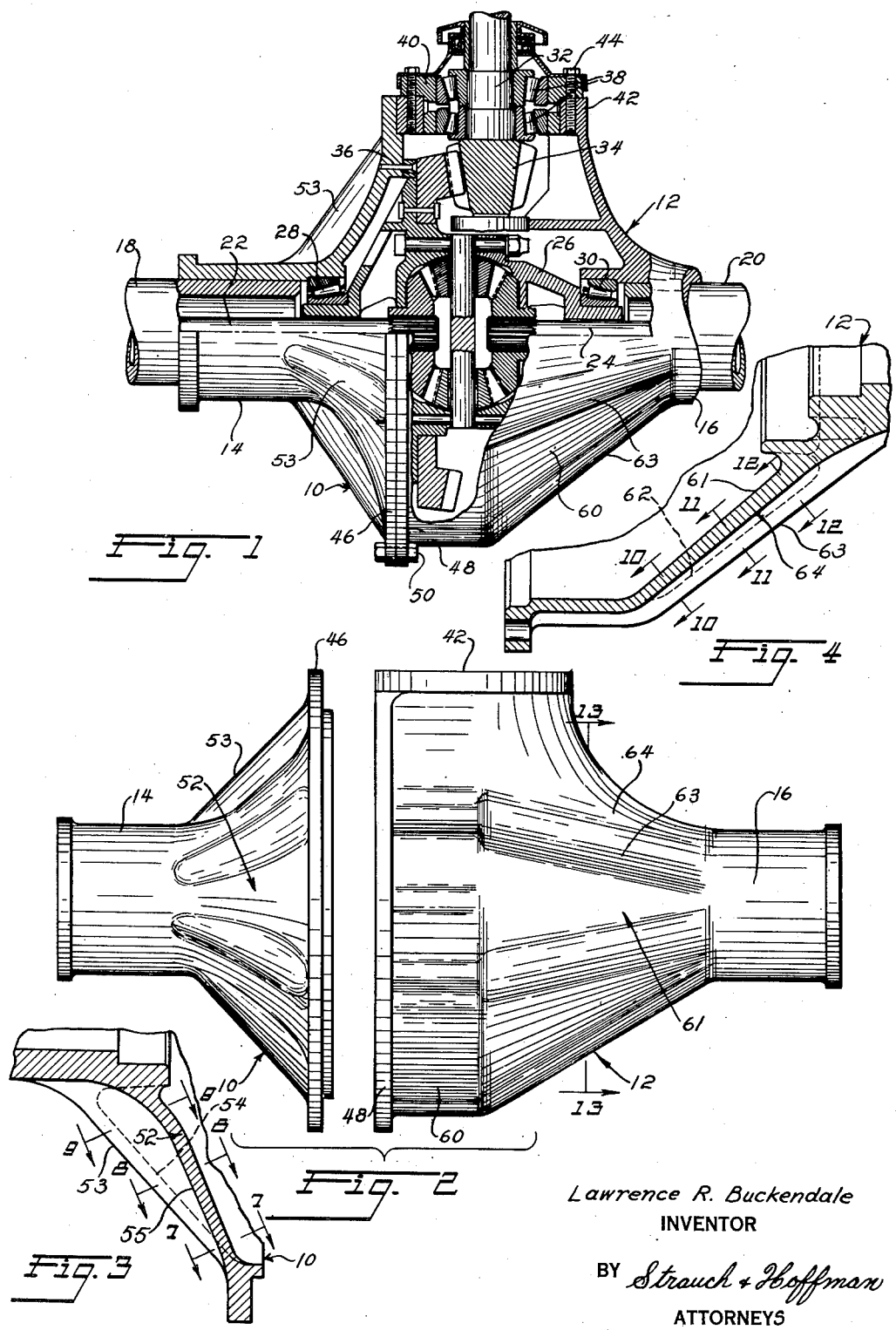
Lawrence R. Buckendale
INVENTOR
BY Strauch + Hoffman
ATTORNEYS

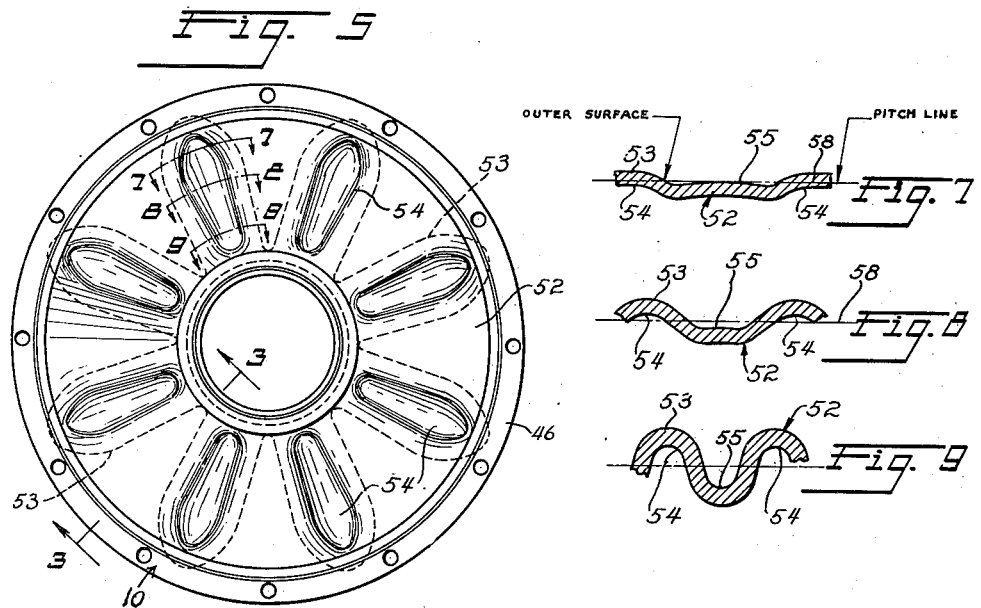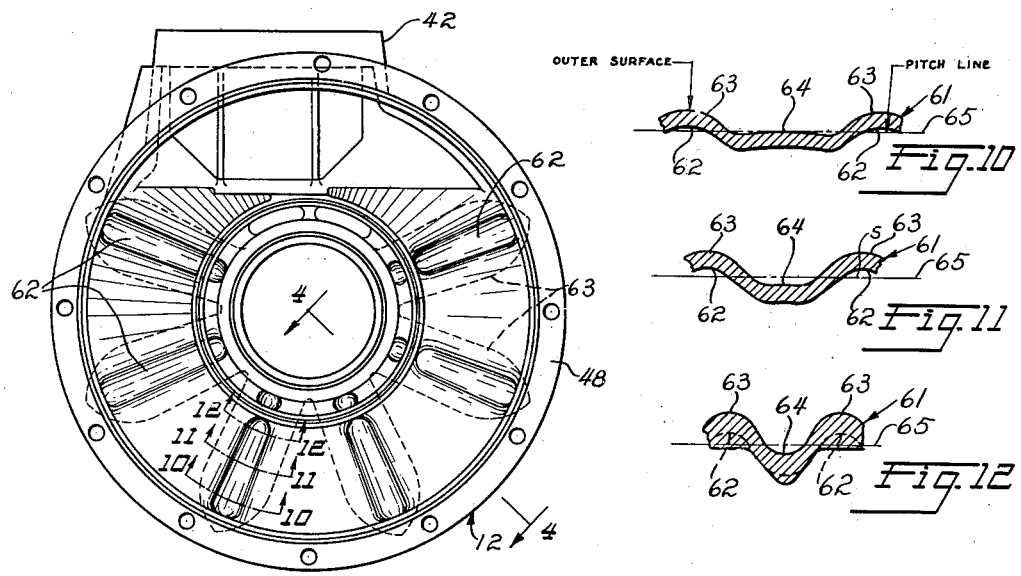

Aug. 9, 1949.    L. R. BUCKENDALE    2,478,180
CONVOLUTED AXLE HOUSING MEMBER
Filed Jan. 14, 1946    4 Sheets-Sheet 3
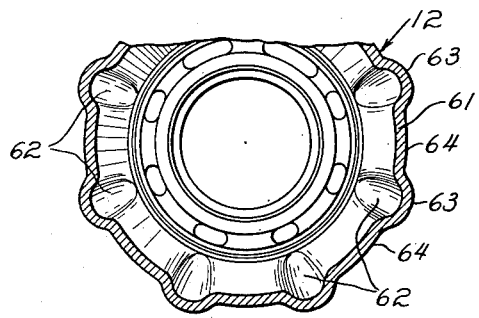
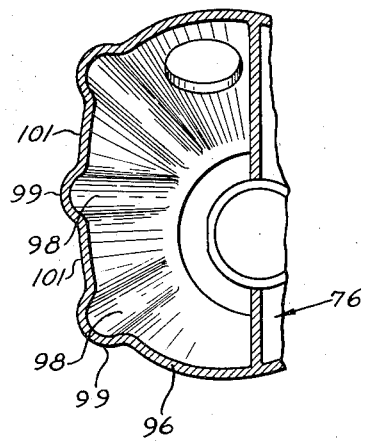
INVENTOR.
Lawrence R. Buckendale
BY
Strauch & Hoffman
ATTORNEYS Aug. 9, 1949.                L. R. BUCKENDALE                 2,478,180
                      CONVOLUTED AXLE HOUSING MEMBER
Filed Jan. 14, 1946                                    4 Sheets-Sheet 4

Lawrence R. Buckendale
INVENTOR

BY Strauch & Hoffman
ATTORNEYS

Patented Aug. 9, 1949

2,478,180

UNITED STATES PATENT OFFICE 2,478,180

CONVOLUTED AXLE HOUSING MEMBER

Lawrence R. Buckendale, Detroit, Mich., assignor to The Timken-Detroit Axle Company, Detroit, Mich., a corporation of Ohio Application January 14, 1946, Serial No. 641,152

6 Claims. (Cl. 74—607)

1

This invention relates to improved drive axle housings and particularly differential carrier housing structure for motor vehicle drive axles, and has for its general object and purpose to provide structure of this kind particularly suitable for use in medium and heavy duty vehicles which may be inexpensively manufactured, is comparatively light in weight, and will effectively resist radial or circumferential bending or distorting stresses.

Heretofore, such carrier housings have usually been cast with longitudinally extending external solid ribs reenforcing a heavy thick walled structure in which casting faults difficult to detect are very likely to occur. In the present invention I provide a lighter thinner-walled metal structure in which such defects or faults are mainly avoided by specially integrally forming the wall of the housing with a plurality of longitudinal channels which provide increased radial and circumferential rigidity in the structure and offer maximum resistance to bending or distorting stresses during vehicle operation.

A further object of the invention, in a specific embodiment thereof, is to provide a reinforced carrier housing structure having internally open integral longitudinal channels formed in an inclined wall.

It is a further object of the invention to provide a drive axle housing part, such as one side of a split-type axle housing, which comprises an open-ended hollow structure having an inner attachment end and an outer hollow axle arm attachment boss, with a longitudinally channeled wall structure intermediate said inner and outer ends comprising a plurality of circumferentially spaced integral inwardly open wall channels, said entire housing member being of minimum weight yet of maximum strength and resistance to circumferential and radial distortion due to forces encountered during normal operation.

Another object is to provide channeled inclined walls in a housing or carrier structure which increase in thickness toward the smaller end of the structure for uniform strength.

With the above and other objects in view, the invention comprises the improved differential housing or carrier structure and the construction and arrangement of its several parts as will hereinafter be more fully described, illustrated in the accompanying drawings and consequently incorporated in the subjoined claims.

In the drawings, wherein I have illustrated the application of the invention to a split type axle differential carrier housing and to a bowl type axle differential carrier housing, and in which similar reference characters designate corresponding parts throughout the several views:

Figure 1 is a partial horizontal sectional view showing an assembled split two-part housing

2 structure with a well known type of differential axle driving unit mounted therein:

Figure 2 is a plan view of the two housing parts of Figure 1 in disassembled relation;

Figure 3 is a fragmentary section along line 3—3 of Figure 5 illustrating details of the channeled wall;

Figure 4 is a fragmentary section along line 4—4 of Figure 6 illustrating details of the channeled wall;

Figure 5 is an internal end elevation of the left hand housing part of Figure 2;

Figure 6 is a similar internal view of the other housing part of Figure 2;

Figure 14:
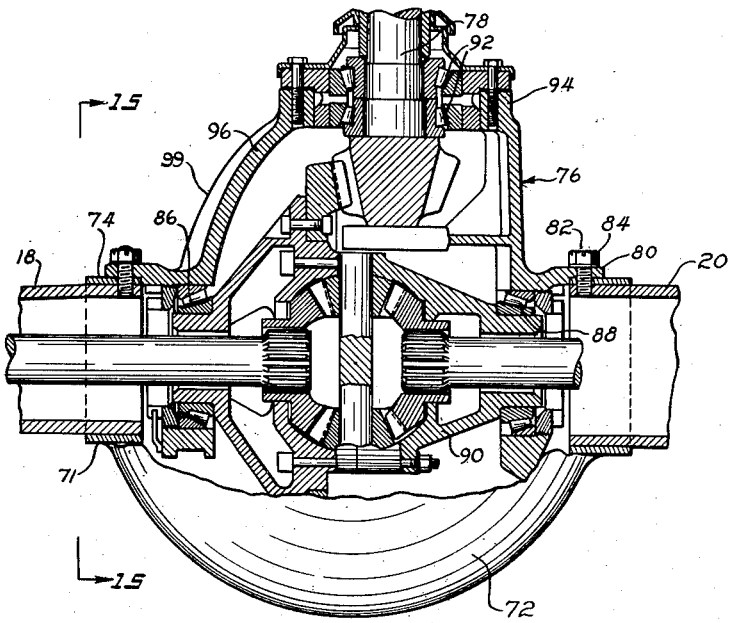
Figure 15:
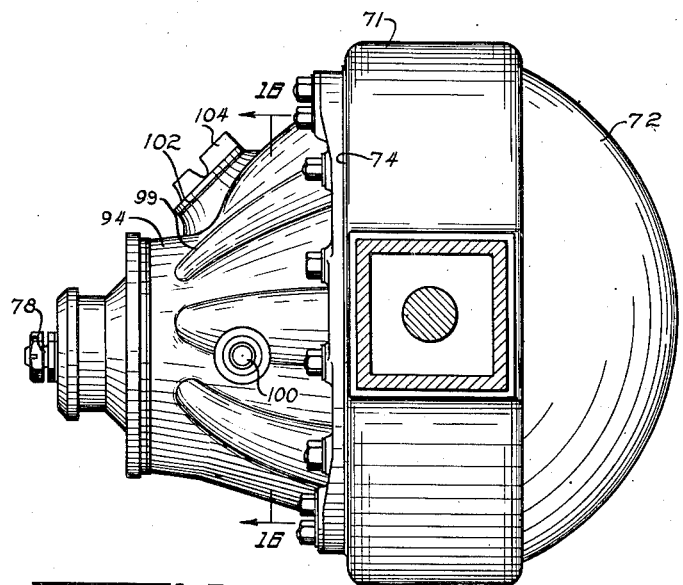

Figures 7, 8 and 9 are detailed fragmentary sectional views taken on the lines 7—7, 8—8, and 9—9 respectively of Figures 3 and 5;

Figures 10, 11 and 12 are similar fragmentary sectional views taken on the lines 10—10, 11—11 and 12—12 respectively of Figures 4 and 6;

Figure 13 is a section substantially along line 13—13 of Figure 2 illustrating the channeled housing structure;

Figure 14 is a horizontal sectional view illustrating a bowl type axle differential carrier embodying the present invention;

Figure 15 is an end elevation and sectional view taken on the line 14—14 of Figure 14; and Figure 16 is a section substantially along line 16—16 of Figure 15 illustrating the channeled structure.

Referring in further detail to the drawings, and for the present more particularly to Figure 1 thereof, the split-type axle center portion or differential carrier housing comprises two separable sections 10 and 12 respectively. These housing sections are formed with tubular hub extensions in the form of cylindrical bosses 14 and 16 respectively, which are adapted to receive and be rigidly secured to the axle arms or casings 18 and 20 respectively which enclose the wheel driving shafts 22 and 24.

The housing sections 10 and 12 are internally formed with suitable means to receive and support the differential axle driving unit. For the purpose of this description, it will suffice to state that the differential cage which encloses the side gears and pinions has oppositely extending hub portions through which the respective axle shafts 22 and 24 extend and are journalled in suitable anti-friction bearings 28 and 30 respectively mounted in the inner ends of hubs 14 and 16 on the housing sections 10 and 12.

A drive shaft 32, having a pinion 34 meshing with a ring gear 36 secured to the differential casing 26, is mounted in suitable anti-friction bearings 38 carried by a flanged sleeve 40 fitted within the forwardly facing annular boss 42 of the housing section 12 and rigidly secured thereto by means of suitable screws indicated at 44.

The housing sections 10 and 12 are provided at their adjacent open sides with bolting flanges 46 and 48 respectively and when said sections are secured in assembled relation as by means of bolts 50, the plane of division between the housing sections is disposed substantially at right angles to the axle shafts 22 and 24 and in spaced parallel relation from the axis of drive shaft 32. The general structural form of the housing sections and the differential drive mechanism mounted therein are substantially the same as that disclosed in the United States Letters Patent to Alden No. 2,056,881 of October 6, 1936, to which reference may be had for a further detailed understanding thereof.

The present invention resides more particularly in certain novel structural features of the axle housing walls whereby a comparatively light weight and inexpensive metal housing may be produced having the required strength and rigidity to prevent fracture or distortion of the housing walls by such strains or stresses to which they may be subjected under all conditions of normal and practical use.

With reference to Figures 2–6, each cast and machined housing section 10 and 12 comprises an inclined, generally conical wall intermediate its end boss and attachment flange integrally formed with a plurality of equally circumferentially spaced internal channels that radiate from the boss toward the attachment flange. As illustrated in Figure 2, these channel formations appear as a plurality of raised and rounded portions radiating longitudinally of the housing section, and the housing wall between each channel may be generally correspondingly formed as will appear.

Referring now to Figures 2, 3 and 5, the substantially conical wall 52 of housing section 10 is integrally formed with a plurality of internally open channels 54 radiating longitudinally from boss 14 to flange 46. Externally the channeled wall appears to have a plurality of correspondingly radiating rounded longitudinal formations 53 raised from its outer surface 55.

Preferably channels 54 gradually increase in depth and decrease in width from the neighborhood of flange 46 to boss 14. This is illustrated in the sections of Figures 7, 8 and 9. Preferably also the thickness of wall 52 progressively increases from flange 46 to boss 14 to thereby provide adequate metal in the smaller diameter portions to withstand strains encountered in operation. In Figures 7, 8 and 9 the line 58 indicates a median or pitch line envelope with respect to the inner and outer surfaces of the housing it being apparent from these figures that the channel formation and the wall portion between them may be regarded as generally similarly radially displaced in opposite directions from such an envelope. The shape of the outer wall surfaces intermediate the channels is of course not the same as the interior surfaces of the channels as will be apparent from Figure 2.

The other housing section 12 is formed adjacent flange 48 with a generally cylindrical portion 60 extending about the ring gear and with a generally conical wall 61 extending between that portion 60 and boss 16. Wall 61 is internally formed with a plurality of channels 62 which radiate longitudinally thereof. Channels 62 are similarly formed and preferably equally spaced about the housing circumference, but being omitted in the sector where boss 42 is formed. Externally the channels appear as rounded formations 63 raised from the outer surface 64 of wall 62 and radiating from boss 16 to cylindrical wall 60.

Like channels 54, channels 64 also preferably gradually increase in depth and decrease in width between cylindrical wall 60 and smaller diameter boss 16. Like wall 52, wall 62 preferably increases gradually in thickness toward boss 16. The theoretical pitch line or median envelope of the inclined wall of housing section 12 is indicated at 65 on Figures 10–12.

Preferably when housing sections 10 and 12 are bolted together, the respective channeled portions of each are longitudinally aligned as indicated in Figure 2, the channels in each section being illustrated in Figures 5 and 6 as radiating at the same angle. This provides for maximum bending resistance in the assembled axle.

My above described channeled housing and carrier structure is equivalently as strong or stronger than previously employed externally ribbed structures, but employs much less metal so as to provide a lighter, less expensive structure. The channeled structure is particularly resistant to bending stresses due to load and rotational stresses due to brake and drive torque. Eliminating the previously considered necessary heavy external ribs reduces cooling strains in the casting, thereby avoiding flaws.

The combination of this novel center section of the split-type axle in the invention with other portions of a novel axle housing assembly is described and claimed in my co-pending application, Serial No. 641,151, filed on even date herewith.

From the above description it will be seen that the present invention provides a two part housing structure for the axle differential unit which may be produced at minimum manufacturing cost, and yet is extremely rugged and capable of effectively resisting high radial or circumferential bending or distorting stresses. Thus, the present invention provides a light weight sectional housing structure which may advantageously be used in medium and heavy duty vehicles, as well as in other types of passenger and commercial motor vehicles.

In Figures 14–16, I have illustrated an embodiment of the invention as applied to a differential carrier for a bowl type axle. In this case the axle arms 18 and 20 are welded or otherwise rigidly secured to the opposite sides of an annular integral center section 71 which carries at its rear side a semi-spherical bowl 72. While in Figure 14, the axle arms are shown as of rectangular form in cross section, cylindrical axle arms may be used if desired. At the front side of the axle arms 18 and 20, the section 71 is provided with a vertical carrier bolting face indicated at 74.

A machined differential carrier casting 76 together with center section 71 and the axle bowl 72 completely houses the differential drive mechanism which is preferably of substantially the same construction as that above described, all parts of said mechanism including the drive shaft 78 being mounted upon and supported by the carrier 76. This carrier is provided with the attaching flange 80 at its larger end adapted to be removably secured to the bolting face 74 of center section 71 by the stud bolts 82 and nuts 84. This larger inner end of the carrier is provided with means supporting the anti-friction bearings 86 and 88 in which the hubs of the differential gear cage 90 are journalled.

The drive shaft 78 is journalled in suitable anti-friction bearings 92 mounted in the front small diameter end boss 94 of the carrier 76. From this boss 94 of the carrier, the body wall thereof has its major portion longitudinally outwardly curved toward attaching flange 80 as indicated at 96. This arcuate body wall 96 of the carrier is formed with a plurality of circumferentially equally spaced longitudinally extending internal channels 98 illustrated best in Figure 16. As illustrated in Figure 15 the channeled carrier appears externally to be provided with longitudinally radiating rounded formations 99 raised from the outside surface 101 as in the other imbodiments of the invention. These channels may be also of changing depth from end to end as desired.

The body wall of carrier 76 is provided with a lubricant supply nipple indicated at 100 and also with an inspection opening 102 normally closed by means of the threaded plug 104. The channeled portion of the body wall of the carrier serves to strongly reinforce and increase the rigidity of the carrier structure both against bending and rotational stresses so that it will effectively resist high longitudinal or lateral operational forces and maintain the several parts of the differential drive mechanism in proper relation to each other and to the wheel axles for efficient operation.

In both embodiments of my invention a differential carrier or housing is provided between a smaller boss end and a larger diameter attachment end with an inclined wall portion which is channeled longitudinally. In one embodiment the inclined wall is approximately conical, while in the other the inclined wall is closer to a spherical or bowl shape. In the claims reference to the inclined wall portion will be understood to be of such scope as to embrace both such alternatives in a wall structure which may be either straight or arcuate.

The same advantages of minimum weight and cost of metal with optimum strength against bending and rotational stresses during operation is obtained in both embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An open-ended hollow housing member for axle drive mechanism formed at one larger end with an attachment portion having a flange for securing it to another housing member of the axle mechanism and at its other smaller end with a substantially annular portion, and an inclined wall on said housing member between said attachment portion and said substantially annular portion, said inclined wall directly merging into said substantially annular portion and said attachment portion and being integrally formed with a plurality of circumferentially spaced longitudinally radiating reinforcing channels substantially coextensive in length with said wall and which are internally open and appear externally as a plurality of transversely rounded formations above the outer surface of said housing member.

2. The housing member defined in claim 1, wherein said channels increase in width and decrease in depth from said annular portion toward said attachment portion.

3. A differential carrier having an inclined housing wall and provided with an axle housing attachment having a flange at one end thereof and means on said one end of the carrier for mounting a differential gear casing, said housing wall at its other end terminating in a substantially annular portion smaller than said flange, and said housing wall being integrally formed with a plurality of circumferentially angularly displaced portions providing internally open longitudinal channels extending the length of said inclined wall and directly merging into said housing attaching portion and said substantially annular portion, said channels appearing as a plurality of transversely rounded formations above the outer surface of said carrier.

4. A split type axle housing assembly comprising a pair of oppositely extending center section housing parts having enlarged adjacent end flanges rigidly secured together and remotely terminating in reduced outer hollow axle arm attachment bosses, inclined walls between each said associated flange and boss, with each said wall being formed integrally with a plurality of circumferentially spaced internally open longitudinal reinforcing channels extending the length of each wall to merge directly with the associated flange and boss, and said channels appearing as a plurality of transversely rounded formations above the outer surfaces of said housing parts.

5. In the axle housing member defined in claim 1, the inclined housing wall intermediate said attachment portion and substantially annular portion being of gradually increasing thickness towards said substantially annular portion.

6. An open-ended differential carrier housing comprising an axle housing attachment flange at one end, means projecting from said one end for mounting differential gear mechanism, an end portion at the other end of said carrier for attachment of pinion shaft mounting means, a housing wall between said flange and said end portion, and a plurality of internally open transversely rounded channels that are circumferentially spaced and extend longitudinally from said flange to said end portion formed integrally in said wall, said channels appearing externally as rounded formations above the outer surface of said carrier housing.

LAWRENCE R. BUCKENDALE.

REFERENCES CITED

The following references are of record in the file of this patent:

UNITED STATES PATENTS

| Number | Name | Date |
| --- | --- | --- |
| 1,187,710 | Church | June 20, 1916 |
| 1,946,051 | Alden | Feb. 6, 1934 |
| 2,153,287 | Wallace | Apr. 4, 1939 |
| 2,219,025 | Vanderberg | Oct. 22, 1940 |
| 2,370,641 | Dewey | Mar. 6, 1945 |

FOREIGN PATENTS

| Number | Country | Date |
| --- | --- | --- |
| 446,937 | France | Dec. 18, 1912 |
| 603,468 | France | Apr. 16, 1926 |